United States Patent
Blumentritt et al.

(10) Patent No.: US 11,486,720 B2
(45) Date of Patent: Nov. 1, 2022

(54) METHOD AND DRIVER ASSISTANCE SYSTEM FOR IMPROVING RIDE COMFORT OF A TRANSPORTATION VEHICLE AND TRANSPORTATION VEHICLE

(71) Applicant: VOLKSWAGEN AKTIENGESELLSCHAFT, Wolfsburg (DE)

(72) Inventors: Marc Blumentritt, Braunschweig (DE); Frank Bärecke, Wolfsburg (DE); Stefan Kukla, Wathlingen (DE)

(73) Assignee: Volkswagen Aktiengesellschaft

( * ) Notice: Subject to any disclaimer, the term of this patent is extended or adjusted under 35 U.S.C. 154(b) by 130 days.

(21) Appl. No.: 16/762,239

(22) PCT Filed: Oct. 11, 2018

(86) PCT No.: PCT/EP2018/077666
§ 371 (c)(1),
(2) Date: May 7, 2020

(87) PCT Pub. No.: WO2019/091689
PCT Pub. Date: May 16, 2019

(65) Prior Publication Data
US 2021/0190519 A1 Jun. 24, 2021

(30) Foreign Application Priority Data
Nov. 10, 2017 (DE) .................. 10 2017 220 094.4

(51) Int. Cl.
*G01C 21/34* (2006.01)
*G01C 21/36* (2006.01)
(Continued)

(52) U.S. Cl.
CPC .......... *G01C 21/3461* (2013.01); *B60W 10/18* (2013.01); *B60W 10/20* (2013.01);
(Continued)

(58) Field of Classification Search
CPC .......... G01C 21/3461; G01C 21/3691; B60W 10/18; B60W 10/20; B60W 30/00;
(Continued)

(56) References Cited

U.S. PATENT DOCUMENTS 8,788,146 B1 7/2014 Lu et al.
9,587,952 B1 3/2017 Slusar
(Continued)

FOREIGN PATENT DOCUMENTS

DE 102007037329 A1 2/2008
DE 102010029922 A1 12/2011
(Continued)

OTHER PUBLICATIONS

Search Report for International Patent Application No. PCT/EP2018/077666; dated Mar. 26, 2019.

*Primary Examiner* — Anne Marie Antonucci
*Assistant Examiner* — Jingli Wang
(74) *Attorney, Agent, or Firm* — Barnes & Thornburg, LLP

(57) ABSTRACT

A method for improving the ride comfort of a transportation vehicle including planning a first driving route by a navigation system; automatically detecting at least one road parameter of the first driving route by a sensor system of the transportation vehicle; automatically evaluating the first driving route in view of the ride comfort of the first driving route by taking into account the road parameter; and in response thereto using the first driving route or planning an alternative driving route.

20 Claims, 2 Drawing Sheets

(51) Int. Cl.
*B60W 10/18* (2012.01)
*B60W 10/20* (2006.01)
*B60W 30/00* (2006.01)
*B60W 40/072* (2012.01)

(52) U.S. Cl.
CPC .......... *B60W 30/00* (2013.01); *B60W 40/072* (2013.01); *G01C 21/3691* (2013.01); *B60W 2420/42* (2013.01); *B60W 2420/52* (2013.01); *B60W 2420/54* (2013.01); *B60W 2420/62* (2013.01); *B60W 2552/15* (2020.02); *B60W 2552/25* (2020.02); *B60W 2552/35* (2020.02)

(58) Field of Classification Search
CPC .......... B60W 40/072; B60W 2552/25; B60W 2552/35; B60W 2552/15; B60W 2420/42; B60W 2420/52; B60W 2420/54; B60W 2420/62
See application file for complete search history.

(56) References Cited

U.S. PATENT DOCUMENTS

| | | |
|---|---|---|
| 2013/0035849 A1 | 2/2013 | Shen |
| 2014/0195112 A1* | 7/2014 | Lu ........................ B60G 17/016 703/2 |
| 2014/0277872 A1 | 9/2014 | MacNeille et al. |
| 2016/0086285 A1* | 3/2016 | Jordan Peters .. G08G 1/096827 701/484 |
| 2017/0232915 A1 | 8/2017 | Dufford |
| 2020/0088529 A1* | 3/2020 | Kukreja ................. G01C 21/34 |

FOREIGN PATENT DOCUMENTS

| | | | |
|---|---|---|---|
| DE | 102014200031 A1 | 7/2014 | |
| DE | 102015218830 A1 | 3/2017 | |
| DE | 102016208883 A1 | 11/2017 | |
| WO | 2014139821 A1 | 9/2014 | |
| WO | 2017053357 A1 | 3/2017 | |
| WO | WO-2017053357 A1 * | 3/2017 | ......... G01C 21/3691 |

* cited by examiner

METHOD AND DRIVER ASSISTANCE SYSTEM FOR IMPROVING RIDE COMFORT OF A TRANSPORTATION VEHICLE AND TRANSPORTATION VEHICLE

PRIORITY CLAIM

This patent application is a U.S. National Phase of International Patent Application No. PCT/EP2018/077666, filed 11 Oct. 2018, which claims priority to German Patent Application No. 10 2017 220 094.4, filed 10 Nov. 2017, the disclosures of which are incorporated herein by reference in their entireties.

SUMMARY

Illustrative embodiments relate to a method and a driver assistance system for improving the ride comfort of a transportation vehicle, which makes travel particularly pleasant for occupants.

BRIEF DESCRIPTION OF THE DRAWINGS

Exemplary embodiments are described below in detail based on the attached drawings. In the drawings.

DETAILED DESCRIPTION

Figure 1:
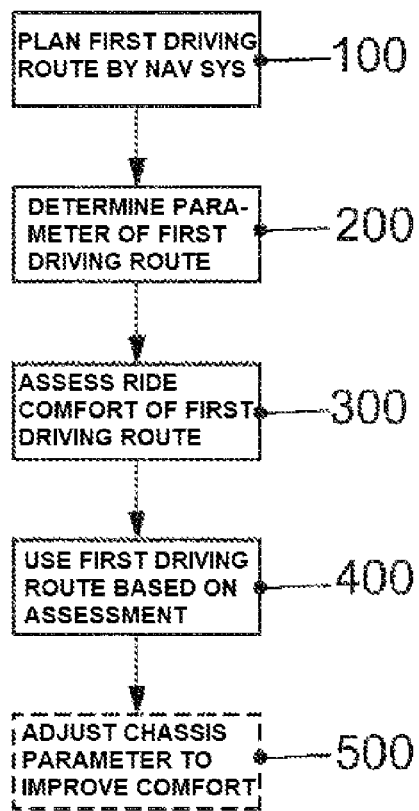
FIG. 1 shows a flowchart illustrating a method for improving the ride comfort of a transportation vehicle according to an exemplary embodiment.

The ride comfort of a transportation vehicle is determined on the one hand by the technical components of the transportation vehicle itself and on the other hand by the chosen driving route and is also dependent on the sensitivities of the occupant or the occupants of the transportation vehicle. Forces acting on a transportation vehicle, such as acceleration forces or braking forces, can be controlled by a proactive chassis and suitable chassis components in such a way that the acting forces/alternating forces are transferred to the occupants as little as possible. In addition, a planned driving route can be examined for its characteristics, for example, its gradient, its inclination, its curve radii, etc., and the analyzed route parameters can be taken into account in the route planning. A method is known from DE 10 2010 029 922 A1 that increases driving safety in autonomous transportation vehicles. For this purpose, settings of so-called assemblies, such as braking devices, drive engines, active chassis systems or steering systems are stored when driving through a section of the driving route. When driving through the same section of the driving route again, the stored data can be accessed and appropriate assembly settings can be made preventatively. Transportation vehicle condition variables or environmental information, such as road conditions or the presence of obstacles, are also determined using a sensor system of the transportation vehicle, which improves the optimization of the settings of the assemblies with regard to the transportation vehicle's driving safety. WO 2014/139821 A1 reveals a method for determining a driving route for a transportation vehicle that is at least partially autonomous. The driving route can be determined based on generated map material, wherein the data of the map material can be derived from several navigation data sources. As a result of this, selecting a driving route for the shortest distance will be made easier and maximum use can be made of the autonomous driving ability of the transportation vehicle.

Based on this prior art, disclosed embodiments specify a method and a driver assistance system which improve the ride comfort for an occupant of a transportation vehicle and make travel with the transportation vehicle even more pleasant. Moreover, disclosed embodiments provide a transportation vehicle which is characterized by high ride comfort and comfort-oriented transportation.

The aforementioned is achieved according to a first disclosed embodiment by a method for improving the ride comfort of a transportation vehicle, which includes the following operations.

In a first operation, a first driving route is planned by a navigation system. For this purpose, the navigation system can be supplied by the occupant with data for an initial position and/or a target position. The navigation system can be an integral part of the transportation vehicle or an external navigation system introduced into the transportation vehicle and, if necessary, connected to the transportation vehicle for data technology purposes. Route data, so-called map material, can be stored in the navigation system. Alternatively or additionally, the navigation system can receive satellite data for the first driving route to be planned optionally via a wireless communication connection.

In a further operation of the method, an automatic determination of at least one road parameter of the first driving route is carried out. In other words, the planned first driving route will be approached first. At least one road parameter of the first driving route is then determined by a sensor system of the transportation vehicle. A sensor system of the transportation is understood here to be a sensor system in the conventional sense, for example, an environmental sensor, optical sensors, accelerometers and the like, and thus expressly not antennas for receiving data from external sources. The sensor system is located directly in or on the transportation vehicle and automatically determines the road parameter(s), for example, before or when passing a section of the first driving route.

The road parameter(s) to be determined is/are not limited in detail and may relate to any condition of a section of the first driving route, such as road bumps, road gradient and curve radii.

On the basis of or taking into account the determined road parameter or the determined road parameters, an automatic evaluation of the first driving route is then carried out with a view to the ride comfort of the first driving route. This means that the first driving route is classified and reassessed in terms of its ride comfort. For example, if the planning of the first driving route was carried out with a view to a driving route that is as smooth as possible, for example, on the basis of map material, the classification of the first driving route is adjusted so that by taking into account the road parameter determined by the transportation vehicle a reassessment of the first driving route is carried out with regard to its ride comfort. This may mean that a first driving route initially planned as comfortable, for example, due to the road surface which is analyzed by the sensor system of the transportation vehicle before or when passing a section of the first driving route, is classified as less comfortable, i.e., compared to alternative routes.

As an example, the automatic evaluation of the first driving route with regard to the ride comfort of the first driving route is carried out similarly to an evaluation of the fastest route, the shortest route and the like for example, in particular, within a rating function in the navigation system, i.e., using reference values. For this purpose, for example, comfort-relevant variables for the first driving route are defined in sections and evaluated, for example, on the basis of a points scale. This can mean, for example, that a section of motorway, which is usually smooth and thus offers a high level of ride comfort, is rated and stored with a low score. A winding country road can be stored with a medium score and a cobbled road section, which causes high vibration of the transportation vehicle, can be stored with a high score. The same applies to other road details, such as level crossings and the like.

A point sum can thus be formed over the entire driving route. The larger this point sum, the lower the ride comfort on this driving route. A target expectation for the ride comfort of the first driving route results from both the individual assessment of the sections of the driving route and the sum of points for the entire driving route. Using point sums, the ride comfort of different driving routes can be compared.

According to the disclosed embodiments, when passing a section of the first driving route at least one road parameter of the first driving route is automatically determined by the sensor system of the transportation vehicle. The subsequent evaluation of the first driving route can be carried out using cycle path sensors by way of example. The data obtained by the cycle path sensors can be converted into energy. Here, "a little energy" means a comfortable section of the driving route and "a lot of energy" means an uncomfortable section of the driving route. The higher the energy, the more uncomfortable the driving route section being travelled. Depending on the energy determined, points can also be awarded for the sections of the driving route, for example. All the data can be transferred to the navigation system and used there. The data may be used to correct the previous classification of the first driving route in terms of ride comfort.

If the determination of the at least one road parameter suggests a deviation of the current expectation of the ride comfort from the target expectation, for example, due to road construction work, which is reflected, for example, in a high score due to the high energies determined for example, by the cycle path sensors, further measures can be initiated.

Thus, in a further operation of the method, the method provides for the use of the first driving route or planning of an alternative driving route in response to the technical assessment of the ride comfort of the first driving route. The first driving route is retained, provided that an assessment of the first driving route shows that no driving route with a higher ride comfort can be chosen while taking into account the automatically determined road parameter or the automatically determined road parameters. The classification of the first driving route based on the automatically determined road parameter or the automatically determined road parameters does not result in a reclassification of the currently planned first driving route. However, if an assessment of the road parameter or the road parameters shows that the first driving route has a very low ride comfort, for example, by determining multiple or larger road bumps, an alternative driving route may be planned.

By the disclosed method, both route planning details and currently present road parameters of the planned first driving route are included in a classification of the first driving route with regard to the highest possible ride comfort, so that the method enables a pleasant journey and travel in the transportation vehicle. The method is simple and easy to implement without a lot of technical effort and is extremely efficient in maximizing the ride comfort in the transportation vehicle.

According to an exemplary embodiment, an operation of storing the at least one road parameter is also provided, for example, to be able to access already known data material during repeat trips and thus to access it faster. In addition, a classification of the first driving route can be carried out more precisely and, if necessary, road parameters previously determined in advance can be taken into account when planning the first driving route or when planning an alternative driving route. The at least one road parameter is stored in a remote location relative to the transportation vehicle, in particular, in a location accessible via a wireless communication connection, such as a cloud, so that storage capacities located in the transportation vehicle can be dispensed with.

The method may include an operation of selecting a driving mode and in response thereto may include planning of the first driving route and/or planning of the alternative driving route. A selectable driving mode can be, for example, a sleep mode or a reading mode, which can be intended for autonomously controllable transportation vehicle. This suggests that the occupant selecting the driving mode prefers a quiet journey with as smooth a mode of travel as possible, so that he is not disturbed in the quiet required for sleeping or reading and is also not subject to motion sickness-related disturbances. Another possible driving mode can also be a sports mode. By selecting the sport mode, it is suggested that the occupant himself tolerates and/or even wishes for winding rides with an inhomogeneous mode of travel. Route planning can therefore be carried out with a view to the shortest possible driving route.

The automatically determined road parameters included in the assessment of the first driving route with regard to the ride comfort of the first driving route are selected from: a curve radius, a route length, a gradient of the first driving route, an altitude profile of the first driving route, a roughness of a road of the first driving route, a surface structure of a road of the first driving route, a traffic flow and any combinations thereof. The road parameters given here have a particularly large influence on the comfort perception of an occupant of the transportation vehicle. The determination of one or more of these road parameters and an automatic assessment of the ride comfort of the first driving route, based on or taking into account this road parameter or these road parameters, has thus proved to be highly efficient in increasing the ride comfort of the transportation vehicle.

The disclosed method further includes an operation of automatic adjustment of at least one chassis parameter to improve the ride comfort. The chassis parameter is adjusted depending on a result of the automatic evaluation of the first driving route or in response to the realization that a road section requiring the chassis parameter is immediately ahead. Thus, the ride comfort of the transportation vehicle can be adjusted particularly well in view of the current events on the first driving route, which makes travelling with the transportation vehicle even more pleasant.

The chassis parameter is selected from: a chassis damping, a chassis suspension, a setting of an active stabilizer and any combination thereof. Due to the chassis parameters specified here, on the one hand the local orientation of the transportation vehicle and on the other hand the ride comfort of the transportation vehicle can be influenced. They thus make a significant contribution to increasing the ride comfort of the transportation vehicle. Adjustment of the chassis suspension, such as adjustment of a transportation vehicle level and/or a spring rate of an air suspension or other suspension, and/or of a degree of damping of a chassis to adjust the hardness of the damping, can compensate and harmonize rolling movements and vertical movements generated by detected road bumps, while adjusting active stabilizers, including adjusting a rate of the active stabilizers, suppresses rolling movements of the transportation vehicle. By a suitable combination of the adjustment of the chassis parameters, the ride comfort can be increased, especially even in the event of different and/or changing road parameters. This method is therefore particularly efficient in the light of an increase in ride comfort.

The method includes the execution of a braking intervention and/or a steering intervention in response to the realization that a road section requiring braking intervention and/or steering intervention is immediately ahead. This allows a longitudinal acceleration and/or a lateral acceleration of the transportation vehicle to be reduced. It is also possible to react efficiently to rapidly changing road characteristics, for example, to the occurrence of a pothole, in relation to stabilization and also to an improvement of the ride comfort.

Especially in the case of travel sickness-prone occupants or when selecting a quiet mode (for example, sleep mode or reading mode) an operation of force decoupling of a passenger cell of the transportation vehicle can be provided. This means that forces acting on the transportation vehicle at least in some situations are not transferred directly to the occupant, so that the ride comfort of the transportation vehicle can be further increased. The decoupling of the passenger compartment is carried out when the automatically determined road parameter or the automatically determined road parameters can be expected to reduce ride comfort during the automatic evaluation of the determined road parameter or the determined road parameters. This is especially to be expected in the case of tight cornering, a high degree of road gradient or slope gradient or in the event of road unevenness.

According to a second disclosed embodiment, a driver assistance system for improving the ride comfort of a transportation vehicle is described. The driver assistance system includes a navigation system, a data input and an evaluation unit.

The navigation system is set up to plan a first driving route. For this purpose, the navigation system can be supplied with starting data and/or destination data of the transportation vehicle, which facilitates the planning of the first driving route.

The data input is set up to receive at least one road parameter of the first driving route, wherein the at least one road parameter is determined by a sensor system of the transportation vehicle. The data input is in contact at least with the evaluation unit for data technical purposes.

The evaluation unit is intended to carry out an automatic assessment of the first driving route in relation to the ride comfort of the first driving route, taking into account the road parameter. A certain reclassification of the first driving route is thus carried out on the basis of or taking into account road parameters currently determined by the sensor system of the transportation vehicle. For example, the reclassification of the first driving route includes a curve radius automatically determined by the sensor system of the transportation vehicle, a length of the first driving route, a gradient of the first driving route, an altitude profile of the first driving route, a roughness of a road of the first driving route, a surface structure of a road of the first driving route, a traffic flow or combinations of these road parameters.

The navigation system is also set up to use the first driving route or to plan an alternative driving route in response to the assessment of the first driving route, to enable the most comfortable way to continue in the transportation vehicle.

In addition, a control device may be provided which, in particular, in the case of autonomously controlled transportation vehicle, carries out the route planning and driving of the planned first driving route and/or a planned alternative driving route. The control device may also be intended to adjust at least one chassis parameter of the transportation vehicle depending on a result of the automatic evaluation of the first driving route or in response to the realization that a road section requiring the chassis parameter is immediately ahead, to further improve the ride comfort of the transportation vehicle. The control device can also control a steering intervention or a brake intervention to influence the ride comfort of the transportation vehicle.

The control device can be a single device here, as a central control device so to speak, or also as multiple separate control devices. The evaluation unit is connected to the control unit by data-technological methods or mechanisms.

Direct influence can be exerted on the motion of the transportation vehicle by the disclosed driver assistance system in such a way that the ride comfort of the transportation vehicle is effectively improved.

The driver assistance system disclosed above is further set up to carry out the method that is also described above for improving the ride comfort of a transportation vehicle. A driver assistance system is thus also described according to a third disclosed embodiment, which is set up for the execution of the method disclosed above. Thus, the benefits, effects and developments which are presented for the disclosed method also apply to the disclosed driver assistance system. To avoid redundancy, therefore, with regard to the disclosed driver assistance system, reference is also made to the disclosed method and vice versa.

According to an exemplary embodiment, the sensor system for determining the at least one road parameter includes a radar system and/or a camera and/or a laser and/or cycle path sensors and/or an accelerometer and/or an ultrasonic sensor. It is self-evident here that multiple systems as indicated above, i.e., multiple cycle path sensors and/or accelerometers and/or ultrasonic sensors, may also be present. This enables all common and essential road parameters to be determined quickly and reliably, which refines an assessment of the first driving route in relation to ride comfort.

According to a further disclosed embodiment, a transportation vehicle is described, which is set up for the execution of the exemplary method disclosed above for improving the ride comfort of the transportation vehicle or which comprises a driver assistance system as previously disclosed. The transportation vehicle is designed as a transportation vehicle and further as an autonomously controlled transportation vehicle and enables particularly comfortable travel with the transportation vehicle. The disclosed transportation vehicle thus contributes to the well-being of its occupants.

The present disclosure is described in detail on the basis of exemplary embodiments. In the figures, only the details of the present disclosure that are essential are shown. All other details are omitted for clarity.

FIG. 1 shows operations of a method for improving the ride comfort of a transportation vehicle.

In operation at 100 of the method, a first driving route is first planned by a navigation system. For example, an occupant of the transportation vehicle indicates at least his destination, for example, as an address, to the navigation system. The navigation system then plans a suitable first driving route, which is based, for example, on the shortest possible driving route of alternative routes that are available for selection.

In operation at 200 of the method, an automatic determination of at least one road parameter of the first driving route is carried out. The road parameter(s) is/are determined by a sensor system of the transportation vehicle, i.e., by a sensor system located in or on the transportation vehicle. Suitable sensor systems include accelerometers, ultrasonic sensors, optical sensors and the like. Any sensors in the transportation vehicle that are suitable for recording and analyzing road parameters can be used for this purpose.

Taking into account the road parameter automatically determined in operation at 200 of the method or the road parameters automatically determined in operation at 200 of the method, an automatic assessment of the first driving route with a view to ride comfort of the first driving route is then carried out in operation at 300 of the method. For this purpose, for example, a comparison can be made with comparative data for the correspondingly determined road parameter(s) and based on this a scaling or classification of the ride comfort can be carried out depending on the road parameter or the road parameters.

In response to the assessment of the first driving route, taking into account the at least one automatically determined road parameter, the first driving route is used in operation at 400 of the method, i.e., there is no change from the first driving route, for example, if the determined road parameters suggest a high ride comfort. However, if the assessment of the road parameter or the road parameters shows that the ride comfort of the first driving route decreases, an alternative driving route may also be planned, whereby the ride comfort is at least maintained at a higher level or even improved.

Examples of road parameters, which are included in the assessment of the ride comfort of the first driving route, are selected from a driving route length, a gradient of the first driving route, an altitude profile of the first driving route, a roughness of a road of the first driving route, a surface structure of a road of the first driving route, a traffic flow and any combination thereof. The determined road parameter(s) can be stored to facilitate an evaluation of the first driving route, for example, when planning the first driving route again and, for example, to avoid particularly uncomfortable sections of the driving route from the outset.

To further improve the ride comfort, an optional operation at 500 of the automatic adjustment of at least one chassis parameter may be provided to improve the ride comfort depending on a result of the automatic evaluation of the first driving route or in response to the recognition that a road section requiring the chassis parameter is immediately ahead. Particularly suitable chassis parameters are selected from: a chassis damping, a chassis suspension, a setting of an active stabilizer and any combination thereof.

The method can effectively improve the ride comfort of the transportation vehicle.

Figure 2:
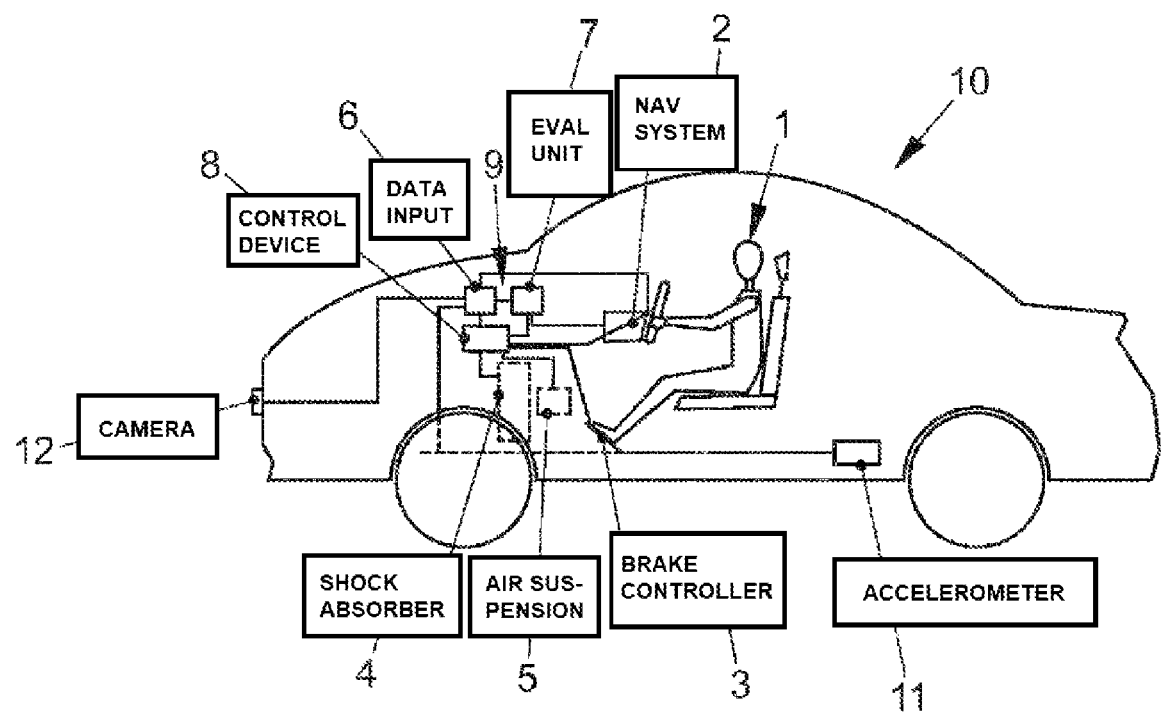
FIG. 2 shows a transportation vehicle according to an exemplary embodiment.

FIG. 2 shows a transportation vehicle 10 according to an exemplary embodiment. In the transportation vehicle 10 there is an occupant 1 that is shown as the driver of the transportation vehicle 10.

The transportation vehicle 10 comprises a driver assistance system 9 for improving the ride comfort of the transportation vehicle 10, wherein the driver assistance system 9 is set up to perform the method illustrated by FIG. 1.

The driver assistance system 9 comprises a navigation system 2, a data input 6, an evaluation unit 7 and a control device 8.

The navigation system 2 is set up for planning a first driving route and can be operated, for example, by the occupant 1 in a way such that the occupant 1 specifies a destination for the navigation system 2, based on which the first driving route is planned.

The data input 6 is set up for receiving at least one road parameter of the first driving route, which is determined by a sensor system of the transportation vehicle 10, which is shown by way of example as an accelerometer 11 and a camera 12. The camera 12 provides data about a course of the road, such as a bend radius, a road inclination, a slope of the road, an altitude profile of the first driving route, a road condition of the first driving route, a roughness of a road surface of the first driving route and any obstacles on the first driving route. The accelerometer 11 may provide data about longitudinal accelerations and/or lateral accelerations and/or vertical accelerations. It is possible to provide additional sensors for the determination of road parameters.

The data input 6 can be in contact with the evaluation unit 7 and also with the navigation system 2 by data-technological methods or mechanisms.

The evaluation unit 7 is set up for the automatic evaluation of the first driving route in relation to the ride comfort of the first driving route, taking into account the automatically determined road parameter.

The evaluation unit 7 is further in contact with the control device 8 by data-technological methods or mechanisms, so that the road parameters input into the data input 6 and evaluated by the evaluation unit 7 can serve to improve the ride comfort after determining the ride comfort of the first driving route, taking into account the at least one road parameter.

The navigation system 2 is also set up to use the first driving route or to plan an alternative driving route that offers greater ride comfort in response to the evaluation of the first driving route. This depends on the corresponding classification of the first driving route, which is carried out while taking into account the determined road parameters.

The intended control device 8 is connected for control purposes to an air suspension 5, a shock absorber 4 and a brake controller 3 by way of example. In this disclosed embodiment, the air suspension 5, the shock absorber 4 and the brake controller 3 are chassis components of the transportation vehicle 10, the chassis parameters of which can be adjusted by the control device 8 depending on the determined road parameters to improve the ride comfort of the transportation vehicle 10.

REFERENCE CHARACTER LIST

1 Occupant
2 Navigation system
3 Brake controller
4 Shock absorber
5 Air spring
6 Data input
7 Evaluation unit
8 Control device
9 Driver assistance system
10 Transportation vehicle
11 Accelerometer
12 Camera
100-500 Operations of the method

The invention claimed is:

1. A method for improving the user ride comfort for of a transportation vehicle, the method comprising:
    planning a first driving route by a navigation system;
    automatically detecting at least one road parameter of the first driving route by a sensor system of the transportation vehicle;
    automatically evaluating the ride comfort of the first driving route utilizing a point scale and based on the at least one road parameter, wherein comfort-relevant variables of the first driving route are assigned point values based on the at least one road parameter for each section of the first driving route and for an entirety of the first driving route, wherein comfort-relevant variables that offer low user comfort are assigned a higher point value on the points scale than comfort-relevant variables that offer high user comfort;
    automatically summing both the initial point values of the comfort-relevant variables of each section of the first driving route and the initial point value of the entirety of the first driving route to determine an initial point sum that is indicative of an overall comfort level of the first driving route;
    in response to the initial point sum being above a target comfort level point sum, performing alternative route planning;
    in response to the initial point sum being below the target comfort level point sum, using the first driving route to navigate the transportation vehicle, during which navigation, the ride comfort of the first driving route is continuously re-evaluated based on both the at least one road parameter for each section of the first driving route and also the at least one road parameter for the entirety of the first driving route, wherein current point values for each comfort-relevant variable are assigned and continuously re-summed to determine a current point sum indicative of the overall comfort level of the first driving route; and
    in response to the current point sum being greater than the initial point sum by a predetermined amount, performing alternative route planning to deviate from the first driving route for further navigation of the transportation vehicle.

2. The method of claim 1, further comprising storing the at least one road parameter in an external storage location accessible via a wireless communication connection.

3. The method of claim 1, further comprising selecting a driving mode and planning the first driving route and/or the alternative driving route in response thereto.

4. The method of claim 1, wherein the road parameter is selected from the group comprising a curve radius, a driving route length, a gradient of the first driving route, an altitude profile of the first driving route, a roughness of a road of the first driving route, a surface structure of a road of the first driving route, a traffic flow and any combinations thereof.

5. The method of claim 1, further comprising automatically adjusting at least one chassis parameter to improve the ride comfort based on a result of the automatic evaluation of the first driving route or in response to the recognition that a road section requiring the chassis parameter is immediately ahead, the chassis parameter being selected from the group comprising a chassis damping, a chassis suspension, a setting of an active stabilizer and any combination thereof.

6. The method of claim 1, further comprising an execution of a braking intervention and/or a steering intervention in response to a sensor-determined finding that a road section requiring the braking intervention and/or the steering intervention is immediately ahead.

7. The method of claim 1, further comprising the force decoupling of a passenger cell of the transportation vehicle.

8. The method of claim 1, wherein the reevaluation of the ride comfort of the first driving route is carried out via cycle path sensors.

9. The method of claim 8, wherein data obtained from the cycle path sensors is converted to energy, wherein a small amount of energy indicates high comfort, and wherein a large amount of energy indicates low comfort.

10. A driver assistance system for improving the user ride comfort of a transportation vehicle, the drive assistance system comprising:
    a navigation system;
    a data input; and
    an evaluation unit,
    wherein the navigation system is configured to plan a first driving route,
    wherein the data input receives at least one road parameter of the first driving route, which is determined by a sensor system of the transportation vehicle,
    wherein the evaluation unit automatically evaluates the ride comfort of the first driving route utilizing a point scale and based on the at least one road parameter, wherein comfort-relevant variables of the first driving route are assigned point values based on the at least one road parameter for each section of the first driving route and for an entirety of the first driving route, wherein comfort-relevant variables that offer low user comfort are assigned a higher point value on the points scale than comfort-relevant variables that offer high user comfort,
    wherein the evaluation unit automatically sums both the initial point values of the comfort-relevant variables of each section of the first driving route and the initial point value of the entirety of the first driving route to determine an initial point sum that is indicative of an overall comfort level of the first driving route,
    wherein, in response to the initial point sum being above a target comfort level point sum, the navigation system performs alternative route planning,
    wherein, in response to the initial point sum being below the target comfort level point sum, the navigation system uses the first driving route to navigate the transportation vehicle, during which navigation, the ride comfort of the first driving route is continuously re-evaluated based on both the at least one road parameter for each section of the at least one section of the first driving route and also the at least one road parameter for the entirety of the first driving route, wherein current point values for each comfort-relevant variable are assigned and continuously re-summed to determine a current point sum indicative of the overall comfort level of the first driving route, and wherein, in response to the current point sum being greater than the initial point sum by a predetermined amount, the navigation system performs alternative route planning to deviate from the first driving route for further navigation of the transportation vehicle.

11. The driver assistance system of claim 10, wherein the sensor system for determining the at least one road parameter comprises:
    a radar system and/or
    a camera and/or
    a laser and/or
    a cycle path sensor system and/or
    an accelerometer and/or
    an ultrasonic sensor.

12. A transportation vehicle including the driver assistance system of claim 10.

13. The system of claim 10, wherein the at least one road parameter is stored in an external storage location accessible via a wireless communication connection.

14. The system of claim 10, wherein a driving mode is selected and the first driving route and/or the alternative driving route is planned in response thereto.

15. The system of claim 10, wherein the road parameter is selected from the group comprising a curve radius, a driving route length, a gradient of the first driving route, an altitude profile of the first driving route, a roughness of a road of the first driving route, a surface structure of a road of the first driving route, a traffic flow and any combinations thereof.

16. The system of claim 10, wherein at least one chassis parameter is automatically adjusted to improve the ride comfort based on a result of the automatic evaluation of the first driving route or in response to the recognition that a road section requiring the chassis parameter is immediately ahead, the chassis parameter is selected from the group comprising a chassis damping, a chassis suspension, a setting of an active stabilizer and any combination thereof.

17. The system of claim 10, wherein an execution of a braking intervention and/or a steering intervention is performed in response to a sensor-determined finding that a road section requiring the braking intervention and/or the steering intervention is immediately ahead.

18. The system of claim 10, wherein the force decouples of a passenger cell of the transportation vehicle.

19. The system of claim 10, wherein the reevaluation of the ride comfort via the navigation system of the first driving route is carried out via cycle path sensors.

20. The system of claim 19, wherein data obtained from the cycle path sensors is converted to energy, wherein a small amount of energy indicates high comfort, and wherein a large amount of energy indicates low comfort.

* * * * *